(12) United States Patent
Jinnoh et al.

(10) Patent No.: US 8,980,112 B2
(45) Date of Patent: Mar. 17, 2015

(54) METHOD FOR RENEWING ORGANIC SOLVENT, METHOD FOR USING ORGANIC SOLVENT, AND METHOD FOR PRODUCING INKJET RECORDING HEAD

(71) Applicant: Canon Kabushiki Kaisha, Tokyo (JP)

(72) Inventors: Masanori Jinnoh, Chita-gun (JP); Masashi Miyagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/082,564

(22) Filed: Nov. 18, 2013

(65) Prior Publication Data
US 2014/0138349 A1    May 22, 2014

(30) Foreign Application Priority Data

Nov. 20, 2012   (JP) .................................. 2012-254234

(51) Int. Cl.
| | |
|---|---|
| C03C 15/00 | (2006.01) |
| C03C 25/68 | (2006.01) |
| C08J 3/28 | (2006.01) |
| B41J 2/16 | (2006.01) |
| C08J 3/09 | (2006.01) |

(52) U.S. Cl.
CPC .... *C08J 3/28* (2013.01); *B41J 2/16* (2013.01); *B41J 2/1631* (2013.01); *B41J 2/1639* (2013.01); *B41J 2/1645* (2013.01); *C08J 3/09* (2013.01); *C08J 2329/12* (2013.01)
USPC .................................. 216/83; 216/93; 216/94

(58) Field of Classification Search
CPC ......................................................... C23F 1/46
See application file for complete search history.

(56) References Cited

U.S. PATENT DOCUMENTS

| | | | | |
|---|---|---|---|---|
| 5,753,135 | A | * | 5/1998 | Jablonsky ........................ 216/93 |
| 2008/0277379 | A1 | * | 11/2008 | Kato et al. ....................... 216/47 |

FOREIGN PATENT DOCUMENTS

| | | |
|---|---|---|
| JP | 08-82937 A | 3/1996 |
| JP | 08-318263 A | 12/1996 |

* cited by examiner

*Primary Examiner* — Duy Deo
(74) *Attorney, Agent, or Firm* — Canon U.S.A., Inc. IP Division

(57) ABSTRACT

A method for renewing an organic solvent includes an ultraviolet irradiation step in which an organic solvent containing a resin is irradiated with ultraviolet rays so as to enhance the ability of the organic solvent to dissolve the resin. A method for using an organic solvent and a method for producing an inkjet recording head utilize the method for renewing an organic solvent.

8 Claims, 2 Drawing Sheets

METHOD FOR RENEWING ORGANIC SOLVENT, METHOD FOR USING ORGANIC SOLVENT, AND METHOD FOR PRODUCING INKJET RECORDING HEAD

BACKGROUND OF THE INVENTION

1. Field of the Invention

The present invention relates to a method for renewing an organic solvent containing a resin, a method for using the renewed organic solvent, and a method for producing an inkjet recording head by utilizing the method for renewing an organic solvent.

2. Description of the Related Art

Recently, the density of integrated circuits has been increasing, and accordingly semiconductor circuits have been becoming finer. Finer semiconductor circuits have been realized by, for example, reducing the wavelength of light used for exposing a pattern or employing an immersion method. When fine semiconductor circuits are produced, the intended performance of the semiconductor circuits may fail to be sufficiently achieved due to, for example, pinholes created in the pattern if the manufacturing process proceeds without removing a foreign substance present on a wafer surface. Thus, there is a stronger demand for a higher level of cleanliness of a wafer surface than before in order to form finer patterns.

In a semiconductor manufacturing process, photosensitive materials are used as, for example, a photoresist used for etching. In a general semiconductor manufacturing process, a photosensitive material is applied to the surface of a material in which a pattern is to be formed and then exposed to light to cause a chemical change. After the exposure, a resist pattern is formed by using a developing solution. Subsequently, the pattern is formed in the material under the photosensitive material by etching. The resist composed of the photosensitive material, which is no longer needed, is removed using a stripping solution.

In the steps of semiconductor manufacturing process, an organic solvent or an aqueous inorganic alkaline solution is commonly used for development or resist removal, and a small amount of the organic solvent or aqueous inorganic alkaline solution used for dissolving the photosensitive material remains as droplets on a wafer. The organic solvent or aqueous inorganic alkaline solution remaining on the wafer is rinsed away with water, which allows the wafer to be quickly dried.

The above-described semiconductor manufacturing process is also employed in manufacture of inkjet recording heads, in which nozzle portions are formed by repeating the steps of applying a photosensitive material to a silicon wafer, exposure, development, and etching.

An inkjet method is a method for recording an image, characters, and the like by ejecting fine ink droplets from a nozzle onto a recording medium (e.g., paper) using any of various operating principles. This method easily realizes high-speed recording, reduced mechanical noise, use of multiple colors and has advantageous features in that, for example, a highly flexible recording pattern can be formed and operations of development and fixation can be omitted, and thus has been increasingly widely used for various purposes. In particular, recently, there has been remarkable development in a full-color inkjet recording technique using water-based ink, which is capable of forming multi-colored images that are comparable to images produced using multi-color printing by an existing platemaking method and printing by color photography.

In response to a growing demand for improved recording properties such as high-definition recording and full-color recording, ink droplets have become finer and there has been a tendency for nozzles to become more densely arranged, and accordingly markedly high accuracy is required for the pattern. Therefore, if a photosensitive material that should have been removed when the nozzles were formed by utilizing a semiconductor manufacturing process remains, the photosensitive material may act as a foreign substance and block the ink-flow passage, which may lead to an adverse phenomenon such as clogging. The remaining photosensitive material may act also as a foreign substance in the steps of etching and exposure, which inhibits formation of an intended pattern. As a result, the designed performance of the inkjet recording head may fail to be sufficiently achieved.

As described above, in the step of removing a photosensitive material, such as development and resist removal, wafers are immersed in a developing-solution tank or a stripping-solution tank to remove the photosensitive material and subsequently immersed and rinsed in a pure water tank. In many cases, a developing solution or a stripping solution adhering to the wafer is replaced with pure water in this way in order to allow the wafer to be quickly dried and to remove the photosensitive material completely. As a result, the photosensitive material gradually accumulates in the developing-solution tank or stripping-solution tank as this wafer treatment proceeds. The photosensitive resin also accumulates in a rinsing tank at a lower concentration than in the solvent tank. This is because the pure water in the rinsing tank is replaced with the solvent containing a large amount of the photosensitive material adhered to the wafer.

When a certain amount or more of photosensitive material has accumulated as this wafer treatment proceeds, the photosensitive material cannot be completely dissolved in the developing-solution tank or the stripping-solution tank. In addition, during rinsing, the photosensitive material component contained in the developing solution or the stripping solution remaining on the wafer precipitates to form a residue. To avoid this, the developing solution, stripping solution, and pure water in the rinsing tank are replaced with new ones after treating certain wafers to remove the photosensitive material. Thus, the amount of photosensitive material contained in these tanks is reduced, which suppresses the formation of a foreign substance on the wafer.

However, the replaced waste liquid resulting from the accumulation of the photosensitive material is disposed of by incineration or the like, which may place a heavy load on the environment. Furthermore, generally, the developing solution and stripping solution used in these steps are expensive electronic grade chemicals, which disadvantageously increase the cost.

Accordingly, for example, in Japanese Patent Laid-Open No. 08-318263, a liquid used for development or resist removal is distilled to remove a photosensitive material and the distilled liquid is reused. This increases the number of wafers that can be processed using the same liquid in which a photosensitive material is dissolved.

In another example, in Japanese Patent Laid-Open No. 08-82937, rinse water is irradiated with ultraviolet rays to reduce the amount of organic materials contained in the rinse water and the resulting rinse water is reused.

SUMMARY OF THE INVENTION

The present invention provides a method for renewing an organic solvent, the method including: an ultraviolet irradiation step in which an organic solvent containing a resin is irradiated with ultraviolet rays so as to enhance an ability of the organic solvent to dissolve the resin.

The present invention also provides a method for using an organic solvent, the method including: redissolving a resin in an organic solvent renewed by the above-described method for renewing an organic solvent.

The present invention further provides a method for producing an inkjet recording head, the method including the steps of:

(i) forming a pattern for forming an ink-flow passage on a substrate on which an ink-ejection energy generating element that generates energy used for ejecting ink is formed, the pattern including a resin soluble in an organic solvent;

(ii) forming a resin coating layer on the pattern for forming an ink-flow passage, the resin coating layer serving as an ink-flow passage wall;

(iii) forming an ink-ejection port in the resin coating layer; and (iv) dissolving and removing the pattern for forming an ink-flow passage using the organic solvent to form an ink-flow passage that communicates with the ink-ejection port.

The organic solvent used for dissolving and removing the pattern for forming an ink-flow passage in the step (iv) is renewed by the above-described method for renewing an organic solvent and then reused as the organic solvent in the step (iv).

Further features of the present invention will become apparent from the following description of exemplary embodiments with reference to the attached drawings.

DESCRIPTION OF THE EMBODIMENTS

Figure 1:
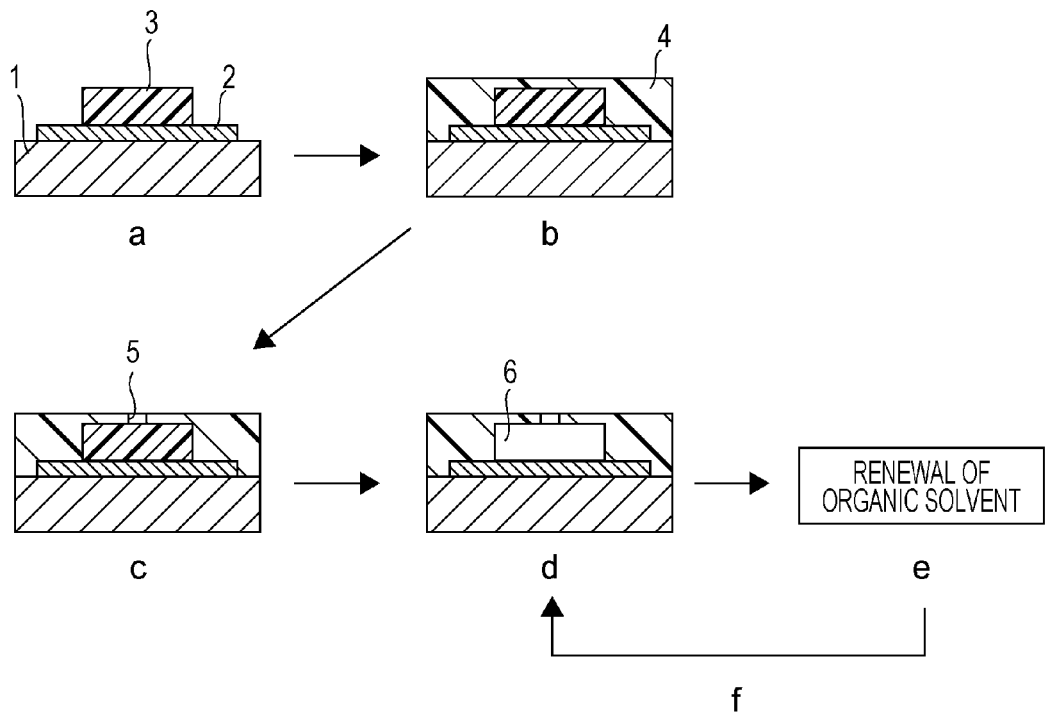
FIG. 1 is a schematic diagram for explaining a nozzle manufacturing process in a method for producing an inkjet recording head in which a method for renewing an organic solvent according to the present invention can be utilized.

According to studies conducted by the inventors of the present invention, the above-described method disclosed in Japanese Patent Laid-Open No. 08-318263 requires a distillation facility and heating of a flammable liquid. Therefore, expensive safety equipment such as explosion-proof equipment may be required, which would require a large investment of capital.

The method disclosed in Japanese Patent Laid-Open No. 08-82937 is intended for rinse water and specifically intended for treatment of a resin contained in the rinse water at a considerably low concentration. Therefore, renewal of an organic solvent used as a developing solution and a stripping solution, which may greatly affect the environmental load and the cost, was not studied.

The present invention was made in order to address the above-described issues. The present invention provides a method for renewing an organic solvent. This method enhances the ability of the organic solvent to dissolve a resin which is reduced by dissolving a resin and allows the organic solvent to be reused for cleaning wafers in order to produce clean wafers. This reduces the cost and the environmental load. The present invention also provides a method for using an organic solvent and a method for producing an inkjet recording head that utilize the method for renewing an organic solvent.

In the method for renewing an organic solvent according to the present invention, an organic solvent having an ability to dissolve a resin which is reduced by dissolving a resin is irradiated with ultraviolet rays, and thereby the resin contained in the organic solvent is decomposed into low-molecular-weight components. This enhances the ability of the organic solvent to dissolving a resin. Utilization of the method for renewing an organic solvent allows the organic solvent to be reused for cleaning wafers in order to produce clean wafers without a residue (foreign substance) on the wafers. This reduces the environment load and the cost. In addition, a good method for producing inkjet recording head by utilizing the method for renewing an organic solvent according to the present invention can be provided.

The present invention will now be described in detail below with reference to the attached drawings.

Method for Renewing Organic Solvent

The method for renewing an organic solvent according to the present invention includes an ultraviolet irradiation step in which an organic solvent containing a resin is irradiated with ultraviolet rays so as to enhance an ability of the organic solvent to dissolve the resin.

Advantages of decomposing a resin by irradiating the resin with ultraviolet rays in an organic solvent are described below.

Generally, the solubility of a material such as a resin in an organic solvent greatly depends on the concentration of the material in the organic solvent. This is because, as the density of the material in the organic solvent increases, the material is less likely to be solvated, which may restrict molecular motion. When the material to be dissolved is a resin, the degree of freedom of molecular motion is likely to be restricted because molecules of a resin are generally large, and thus the solubility of the resin is greatly affected by the increased concentration of the resin in the organic solvent. Specifically, the solubility decreases rapidly as the concentration increases. On the other hand, since molecules of a low-molecular-weight substance are small, the molecular motion is less likely to be restricted as the concentration increases. Therefore, when the resin contained in the organic solvent is decomposed into low-molecular-weight components by ultraviolet irradiation, the resin becomes likely to be solvated when the resin is redissolved in the solvent. Thus, the molecular motion is less likely to be restricted. As a result, a larger number of wafers can be treated compared with the case where the ultraviolet rays treatment is not performed.

In the present invention, the concentration of a resin contained in the organic solvent containing the resin is preferably 10% by mass or less in order to quickly dissolve the resin and to allow ultraviolet rays to efficiently pass through the organic solvent so as to decompose the resin.

When a resin is decomposed by ultraviolet irradiation, Norrish type II decomposition reaction is considered to occur in the resin. The Norrish type II decomposition reaction is a decomposition reaction in which the main chain of a resin is directly cut by losing hydrogen atoms released from reaction sites after passing through an intermediate state of multi-membered ring. Thus, the Norrish type II decomposition reaction is greatly effective for reducing the molecular weight of a resin. The Norrish type II decomposition reaction is likely to occur when molecules of a resin adopt a specific conformation.

For example, when a solid resin is irradiated with ultraviolet rays to be decomposed (e.g., a resin film on a wafer is directly irradiated with ultraviolet rays to be decomposed), the mechanism is presumably as follows. A large amount of energy is absorbed by resin molecules in the surface of the resin film, which are near to a light source, and as a result resin molecules inside the resin film receives a small amount of energy. Therefore, when the resin film is irradiated with ultraviolet rays, there is a need to take into account extra energy equivalent to attenuation by the resin molecules near the light source in order to provide sufficient energy to the resin molecules inside the resin film. This requires extra energy and also disadvantageously increases the temperature of the film surface, which may cause the resin to be degraded and become less soluble in an organic solvent. In addition, since the molecules are fixed in the resin film, the solid resin is less likely to cause the Norrish type II decomposition reaction, in which $\beta$-hydrogen atoms are abstracted from the reaction sites after passing through an intermediate state of a six-membered ring.

On the other hand, in a liquid such as an organic solvent, high-molecular compounds such as a resin are solvated and thus capable of changing the conformation freely. Therefore, the Norrish type II reaction is more likely to occur compared with the case where a resin is irradiated with ultraviolet rays in the form of solid. Thus, the molecular weight of a resin can be reduced by ultraviolet irradiation in an organic solvent more efficiently compared with ultraviolet irradiation in a solid state.

In Japanese Patent Laid-Open No. 08-82937, rinse water containing a resin is irradiated with ultraviolet rays. Since water is a poor solvent for a resin, a resin is less likely to be solvated to a sufficient degree even in rinse water that is seemingly transparent. Thus, molecules of a resin are considered to adopt a conformation that minimizes surface energy in water. Specifically, molecules of a resin forms a spherical shape by folding their molecular chains and thereby minimize the area of the contact surface at which the resin is brought into contact with water per unit mass, which reduces surface energy. Thus, from a molecular-level viewpoint, rinse water containing a resin is considered to be equivalent to an aqueous dispersion prepared by dispersing a solid resin in water. Therefore, molecules of a resin are less likely to change the conformation freely in water even when the rinse water is irradiated with ultraviolet rays, that is, Norrish type II decomposition is less likely to occur. This is disadvantageous for molecular-weight reduction.

The method for renewing an organic solvent according to the present invention is intended for an organic solvent containing a resin, which is produced, for example, in manufacture of inkjet recording heads. In this case, a resin is typically dissolved and solvated in the organic solvent unlike in a dissolved film or a poor solvent such as water in which, for example, association of resin molecules occurs. This allows molecules of a resin to be evenly irradiated with ultraviolet rays, which reduces extra energy and prevents a resin from being degraded due to a local temperature rise and thereby becoming less likely to be decomposed.

Ultraviolet Rays

Ultraviolet rays used in the present invention is an electromagnetic wave having a wavelength of 200 nm or more and 380 nm or less. Ultraviolet rays have a shorter wavelength and higher energy than infrared radiation and visible light. Therefore, ultraviolet rays are capable of cutting the bonds in molecules of a resin dissolved in an organic solvent. In the present invention, the wavelength of ultraviolet rays, the amount of ultraviolet irradiation and irradiation time can be set appropriately depending on the type of resin used and the type of organic solvent used. The specific conditions for ultraviolet irradiation are described below.

Ultraviolet Irradiation System

In the present invention, the ultraviolet irradiation system may be, for example, a water sterilization system produced by IWASAKI ELECTRIC CO., LTD. or an ultraviolet sterilization system produced by Taki Engineering CO., LTD. The general structure that is common to these systems is described with reference to FIG. 2. These systems have two pipes having different diameters, namely, an outer pipe 7 and an inner pipe 8, which form a double-pipe structure. Inside the inner pipe 8 of the double pipe, a light source 9 that emits ultraviolet rays is disposed so as to be oriented vertically. The space between the outer pipe 7 and the inner pipe 8 is a cavity. When an organic solvent containing a resin passes through the cavity, the organic solvent is irradiated with ultraviolet rays emitted by the light source 9. In other words, the cavity portion serves as an ultraviolet irradiation portion 10, in which light (ultraviolet rays) emitted by the light source reaches a treatment liquid (organic solvent containing a resin). Generally, the inner pipe 8 is composed of a material that readily transmits ultraviolet rays, such as silica glass. The treatment liquid introduced through a treatment-liquid inlet port 11 is treated with ultraviolet rays in the ultraviolet irradiation portion 10 and is subsequently discharged out through a treatment-liquid outlet port 12.

The treatment liquid may be passed continuously through the ultraviolet irradiation portion 10 or may be temporarily stored inside the ultraviolet irradiation portion 10 and then replaced. In the case where one cycle of treatment (ultraviolet irradiation) is not enough to decompose the resin to a sufficient degree, the treatment liquid may be passed through the ultraviolet irradiation portion multiple times by, for example, circulation. Optionally, for example, a stirring mechanism such as baffle plates may be disposed inside the ultraviolet irradiation portion 10, and thereby the treatment liquid is irradiated with ultraviolet rays while being subjected to stirring. This increases the efficiency of the treatment. The distance (space) between the outer pipe and the inner pipe is preferably small, that is, about 1 to 20 mm because a resin dissolved in a solvent absorbs ultraviolet rays, which reduces the transmittance of the solvent.

Light Source

The light source 9 that emits ultraviolet rays may be selected appropriately depending on the wavelength of ultraviolet rays used. Examples of the light source 9 include a low pressure mercury lamp, a high pressure mercury lamp, an extra-high pressure mercury lamp, an excimer laser lamp, a halogen lamp, a xenon lamp, a deuterium lamp, a tungsten lamp, a metal halide lamp, an UV-B lamp, and a black lamp. A lamp that emits light at a wavelength of 308 nm in the form of a laser, such as a XeCl lamp, may also be used. A lamp that emits light at a specific wavelength in the form of a strong emission line, such as a low pressure mercury lamp, also emits weak light in the wavelength region between two emission lines. This weak light contributes to decomposition of a resin. Thus, such a lamp may also be used in the present invention.

Among these light sources, chemical lamps such as an UV-B lamp may be used. Chemical lamps are available at fairly low cost. In addition, a resin can be decomposed more quickly by using a plurality of such chemical lamps connected with one another in series, which enhances the efficiency of renewing a solvent.

Resin

The type of resin is not particularly limited and resins used in, for example, inkjet recording heads may be used appropriately. Specific examples of the resins include a polyketone resin, a polymethacrylate resin, a polysulfone resin, and a poly-α-methylstyrene resin. Among these resins, a polyketone resin and a polymethacrylate resin may be used because they are markedly easily decomposed by ultraviolet irradiation. These resins may be used alone or in combination of two or more.

Polyketone Resin

The polyketone resin is a resin prepared by polymerizing ketone compounds having an unsaturated double bond in its molecular structure (e.g., methyl isopropenyl ketone).

Example of the polyketone resin include poly(methyl isopropenyl ketone) (PMIPK), poly(methyl vinyl ketone) (PMVK), poly(methyl phenyl ketone), and poly(t-butyl isopropenyl ketone). A resin prepared by copolymerizing different monomer components each constituting any of these resins may be used as the polyketone resin.

PMIPK is a resin that is most widely used as a Deep-UV resist among polyketone resins. The carbon atom in the main chain of PMIPK, to which a carbonyl group is bonded, is a tertiary carbon atom. Thus, PMIPK is likely to produce relatively long-lived tertiary radicals when absorbing light, which causes decomposition with a high efficiency. This allows an efficient treatment to be easily realized when renewing an organic solvent by the method according to the present invention.

Polymethacrylate Resin

The polymethacrylate resin is a resin prepared by polymerizing any one of or both methacrylic acid and methacrylic acid ester that have a methyl group at an α-position. A polyacrylic resin prepared by polymerizing an acrylic acid or an acrylic acid ester that have a hydrogen atom at an α-position is less easily decomposed by ultraviolet irradiation than a polymethacrylate resin.

Examples of the polymethacrylate resin include poly(alkyl methacrylate)s such as poly(methyl methacrylate), poly(ethyl methacrylate), poly(propyl methacrylate), and poly(butyl methacrylate). A resin prepared by copolymerizing different monomer components each constituting any of these resins may be used as polymethacrylate resin.

Organic Solvent

In the present invention, an organic solvent that readily transmits ultraviolet rays at a wavelength at which the resin used is decomposed may be used. This allows a resin to be efficiently irradiated with ultraviolet rays and to be quickly decomposed. Since the solvent may also be decomposed and degraded by ultraviolet irradiation, a solvent that readily transmits ultraviolet rays may be used in order to prevent the solvent from being degraded. Specifically, when the resin is a polyketone resin, the organic solvent may be one or more solvents selected from ester solvents, ether solvents, alcohol solvents, hydrocarbon solvents, and amine solvents. When the resin is a polymethacrylate resin, the organic solvent may be one or more solvents selected from ketone solvents, ether solvents, alcohol solvents, hydrocarbon solvents, and amine solvents.

The term "ester solvents" herein refers to organic solvents having an ester group in their molecular structures, which are synthesized by condensation of a compound having a carboxylic acid group in its molecular structure (e.g., lactic acid) and a compound having a hydroxyl group in its molecular structure (e.g., methanol). Specific examples of the ester solvents include methyl lactate, ethyl lactate, propyl lactate, butyl lactate, ethyl acetate, butyl acetate, and propylene glycol monoethyl ether acetate.

The term "ketone solvents" herein refers to solvents having a ketone group in their molecular structures, and specific examples thereof include acetone, methyl ethyl ketone (MEK), and methyl isobutyl ketone (MIBK).

The term "ether solvents" herein refers to organic solvents having an ether linkage in their molecular structures, and specific examples thereof include diethyl ether, tetrahydrofuran, dioxane, propylene glycol monomethyl ether, and dimethoxyethane.

The term "alcohol solvents" herein refers to organic solvents having a hydroxyl group in their molecular structures, and specific examples thereof include alcohols such as methanol, ethanol, propanol, isopropanol, butanol, isobutyl alcohol, and t-butyl alcohol.

The term "hydrocarbon solvents" herein refers to organic solvents consisting of carbon atoms and hydrogen atoms, and specific examples thereof include pentane, hexane, heptane, octane, benzene, toluene, and xylene.

The term "amine solvents" herein refers to organic solvents having an amino group in their molecular structures, and specific examples thereof include trimethylamine, ethanolamine, diethanolamine, and triethanolamine.

As in the case of propylene glycol monoethyl ether acetate described above, an organic solvent may belong to multiple solvent groups (e.g., ester solvents and ether solvents).

Ultraviolet Irradiation Conditions

As a result of extensive studies, the inventors of the present invention have found that renewing an organic solvent containing a resin may be easily realized and thereby cleaner wafers may be produced by using a polyketone resin as the resin and, in the ultraviolet irradiation step, irradiating the organic solvent containing the resin with ultraviolet rays until the following conditions are satisfied.

Specifically, the organic solvent containing the resin is irradiated with ultraviolet rays until the molecular-weight area ratio S in the molecular-weight distribution of the polyketone resin (solid component including decomposition products of a polyketone resin due to ultraviolet irradiation) contained in the organic solvent reaches 5% or less. The molecular-weight area ratio S is calculated by the following expression:

Molecular-weight area ratio $S(\%) = a/b \times 100$

Here, a is an area corresponding to components having a molecular weight of 2,900 or more and b is an area corresponding to components having a molecular weight of less than 2,900 in a chromatogram obtained by GPC. The molecular-weight distribution of a polyketone resin contained in an organic solvent may be calculated by determining the amount of solid components (polyketone resin and decomposition products thereof) contained in the organic solvent by gel permeation chromatography (GPC). Specifically, the volatile component contained in 10 parts by mass of the organic solvent is removed by a rotary evaporator, and the remaining components are dissolved in tetrahydrofuran (THF) at a concentration of 0.5% by mass to prepare a sample. The sample is then subjected to GPC using a general-purpose GPC system. Then, ultraviolet irradiation is continued until the molecular-weight area ratio S (%) in a chromatogram obtained by GPC, which is calculated by the above expression, reaches 5% or less. This allows a sufficient amount of functional groups present in decomposition products of the resin, which are formed into low-molecular-weight components by ultraviolet irradiation, to be easily converted into water-soluble functional groups.

A smaller molecular-weight area ratio S implies that more high-molecular-weight components are decomposed, that is, the solvent is renewed as a solvent having higher cleaning ability.

For example, when the resin is PMIPK (polyketone resin), as an organic solvent is irradiated with ultraviolet rays, a peak value around 1,700 cm$^{-1}$ due to ketone is reduced and another peak occurs around 1,733 cm$^{-1}$ in an IR spectrum of nonvolatile component. When the molecular-weight area ratio S reaches 5% or less, the peak around 1,700 cm$^{-1}$ disappears and the peak around 1,733 cm$^{-1}$ remains alone. This presumably implies that ketone groups present in molecules of decomposition products of the resin are replaced with more hydrophilic functional groups such as ester groups or carboxylic groups. In fact, precipitation of a polyketone resin occurs when an organic solvent in which a resin is dissolved is dropped into a large amount of water before ultraviolet irradiation. In contract, the precipitation does not occur when the organic solvent has been irradiated with ultraviolet rays so as to adjust the above-described molecular-weight area ratio 5 to 5% or less. As described above, in the GPC measurement, the solid components (resin and decomposition products of the resin) in an organic solvent can be extracted by removing the organic solvent using a rotary evaporator.

In the present invention, when the resin is a polyketone resin and the organic solvent is an ester solvent, the wavelength of ultraviolet rays is preferably 250 nm or more and 350 nm or less and more preferably 290 nm or more and 350 nm or less.

A polyketone resin generally has an absorption with a center, i.e., maximal absorption, at a wavelength of about 290 nm that corresponds to electron transition between a nonbonding orbital and an antibonding orbital and n-π* transition, which decomposes a polyketone resin. Since a carbon-carbon bond has a bond dissociation energy of about 330 kJ/mol, light having a wavelength of 350 nm or less corresponding to the bond dissociation energy is capable of easily cutting the main chain of a polyketone resin. Therefore, the wavelength of ultraviolet rays is preferably 350 nm or less.

An ester solvent generally has a maximal absorption at around 210 nm and thus is less likely to transmit light at a wavelength of around 250 nm or less. Therefore, ultraviolet irradiation at a wavelength of 250 nm or more easily allows a polyketone resin to be effectively provided with light energy. Therefore, the wavelength of ultraviolet rays is preferably 250 nm or more.

An ester solvent generally has another maximal absorption peak at about 330 nm and an absorption band that extends to about 280 nm and that overlaps the peak of a maximal absorbance at around 210 nm in the spectrum. Therefore, it is considered to be impossible to decompose a polyketone resin contained in an ester solvent by ultraviolet irradiation at a wavelength that does not overlap the absorption band of the ester solvent at all.

However, in the case of an ester solvent, the maximal absorbance at about 210 nm is due to the n-π* transition, which is likely to cause decomposition of an ester. On the other hand, the absorption peak of an ester solvent at about 330 nm is not due to the n-π* transition, and thus the ester solvent is less likely to be decomposed even when being irradiated with ultraviolet rays corresponding to the n-π* transition. The absorption peak of an ester solvent at about 330 nm is considerably small relative to the maximal absorbance peak at about 210 nm due to n-π* transition, which allows a polyketone resin to be effectively provided with light energy. Therefore, irradiation with ultraviolet rays at a wavelength of 290 nm or more and 350 nm or less, that is, a wavelength longer than the maximal absorbance of a polyketone resin, allows efficient decomposition of a polyketone resin to be easily realized while suppressing a side reaction of decomposition of an ester solvent.

A commercially-available lamp that efficiently emits ultraviolet rays at the above-described wavelength is an UV-B chemical lamp with a peak emission wavelength of 318 nm.

The amount of ultraviolet irradiation used for irradiating an organic solvent containing a resin is preferably 100 J/liter or more in order to decompose the resin efficiently. The above-described UV-B chemical lamp generally has an irradiation intensity of about 3 to 4 W and is capable of producing 100 J of ultraviolet irradiation in about 25 to 30 seconds when the amount of ultraviolet irradiation is 10 J/liter. The time required for renewing an organic solvent may be shortened using 5 to 10 sets of the irradiation apparatus shown in FIG. 2 connected with one another in series.

Method for Using Organic Solvent

The method for using an organic solvent according to the present invention may include redissolving a resin in an organic solvent renewed by the method for renewing an organic solvent according to the present invention. This method for using an organic solvent may be utilized in various manufacturing methods such as a method for manufacturing an inkjet recording head, a method in which a resin is used as a masking member, and a manufacturing method in which a casting method is employed.

Method for Producing Inkjet Recording Head

The method for renewing an organic solvent according to the present invention may be utilized for producing inkjet recording heads because, as described above, in the manufacture of inkjet recording heads, there has been a demand for the ability to clean wafers in order to produce cleaner wafers as the density of nozzles increases and the size of nozzles becomes small.

The method for producing an inkjet recording head includes the following steps. FIG. 1 is a schematic diagram for explaining the process for manufacturing a nozzle.

(i) forming a pattern for forming an ink-flow passage on a substrate on which an ink-ejection energy generating element that generates energy used for ejecting ink is formed, the pattern including a resin soluble in an organic solvent;

(ii) forming a resin coating layer on the pattern for forming an ink-flow passage, the resin coating layer serving as an ink-flow passage wall;

(iii) forming an ink-ejection port in the resin coating layer; and (iv) dissolving and removing the pattern for forming an ink-flow passage using the organic solvent to form an ink-flow passage that communicates with the ink-ejection port.

In this production method, the organic solvent used for dissolving and removing the pattern for forming an ink-flow passage in the step (iv) is renewed by the above-described method for renewing an organic solvent and then reused as the organic solvent in the step (iv). Thus, good inkjet recording heads can be produced with reduced environmental load and reduced cost. The step (iv) and renewal of an organic solvent may be performed simultaneously. In other words, the step (iv) may be performed while an organic solvent is being renewed. In another case, the renewal of an organic solvent and the step (iv) may be repeatedly performed simultaneously or alternately.

An example of the above-described production method is described with reference to FIG. 1.

As shown in the step a of FIG. 1, a pattern 3 for forming an ink-flow passage, which is composed of a resin soluble in an organic solvent, is formed on a substrate 1 (step (i)). On the substrate 1, for example, an ink ejection pressure-generating element 2 serving as the ink-ejection energy generating element is formed.

As shown in the step b of FIG. 1, for example, a resin that includes an epoxy resin as a main component (most abundant component) and that is solid at normal temperature (25° C.) is dissolved in a solvent medium, and the resulting solution is deposited on the pattern 3 for forming an ink-flow passage by solvent coating to form a resin coating layer 4 serving as an ink-flow passage wall (step (ii)). Examples of the resin used for forming the resin coating layer include EHPE-3150 (product name) produced by Daicel Corporation, which is an epoxy resin described in Japanese Patent No. 3143307 and a resin containing a photopolymerization initiator SP-170 (product name) produced by ADEKA CORPORATION.

As shown in the step c of FIG. 1, an ink-ejection port 5 is formed in the resin coating layer 4. Specifically, an ink-ejection port 5 is formed in the resin coating layer 4 on the ink ejection pressure-generating element 2 and the pattern 3 for forming an ink-flow passage (step (iii)).

As shown in the step d of FIG. 1, the pattern 3 for forming an ink-flow passage, which is composed of a resin, is dissolved and removed using the organic solvent. Thus, an ink-flow passage 6 that communicates with the ink-ejection port 5 is formed (step (iv)).

As shown in the step e of FIG. 1, the organic solvent in which a resin is dissolved is irradiated with ultraviolet rays to decompose the resin contained in the organic solvent by the above-described method for renewing an organic solvent. Thus, the ability of the organic solvent to dissolve the resin is enhanced and, as a result, the organic solvent can be renewed. Then, as shown the step f of FIG. 1, the renewed organic solvent is reused in the step (iv).

As described above, good inkjet recording heads may be efficiently and continuously produced using the organic solvent renewed by the method according to the present invention.

EXAMPLES

The present invention will be now described specifically with reference to Examples and Comparative Example. The present invention is not limited to Examples below and various modifications can be made without departing from the scope thereof.

PMIPK Thin-Film Wafer

A light coating of poly(methyl isopropenyl ketone) (PMIPK) dissolved in cyclohexanone was applied to a silicon wafer by spin coating. The resulting silicon wafer was kept in a drying furnace at 80° C. for 1 hour and dried to form a PMIPK thin-film wafer.

Example 1

Figure 2:
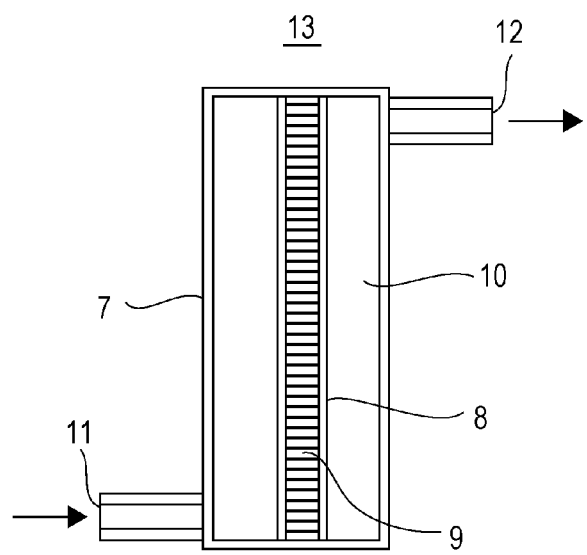
FIG. 2 is a schematic diagram illustrating an example of an apparatus used for irradiating an organic solvent in which a resin is dissolved with ultraviolet rays.

The resulting wafers (100 wafers) were immersed in 10 L of methyl lactate to prepare a liquid mixture of methyl lactate and PMIPK, which was then subjected to a renewal treatment using the system shown in FIG. 2. Specifically, 2.3 L of the liquid mixture of methyl lactate and PMIPK was transferred to a stainless-steel beaker, introduced into a 8-W water sterilization system produced by IWASAKI ELECTRIC CO., LTD. using a pump at a flow rate of 1 L/min, then irradiated with ultraviolet rays (UV) using a low pressure mercury lamp. The low pressure mercury lamp used was a UV-B lamp GLEE produced by Sankyo Denki Co., Ltd. (peak emission wavelength 318 nm, emission intensity 1.6 W). The treatment liquid that passed through the water sterilization system was again introduced into the stainless-steel beaker and irradiated with ultraviolet rays (circulation treatment). Thus, the liquid mixture of methyl lactate and PMIPK was renewed. In this process, ultraviolet irradiation was continued for 48 hours. The amount of ultraviolet irradiation used for irradiating the solvent was about 120 kJ per liter.

Example 2

A liquid mixture of methyl lactate and PMIPK was renewed as in Example 1 except that the ultraviolet irradiation using the 8-W water sterilization system was continued for 6 hours.

Example 3

Methyl isobutyl ketone (MIBK) containing PMIPK was renewed as in Example 1 except that MIBK (non-ester solvent) was used as an organic solvent instead of methyl lactate.

Comparative Example 1

A liquid mixture of methyl lactate and PMIPK was renewed as in Example 1 except that the liquid mixture of methyl lactate and PMIPK was not irradiated with ultraviolet rays.

Evaluation

Ability to Clean Wafers

The organic solvents renewed in Examples and Comparative Example were evaluated in terms of an ability to clean wafers by the following method. Specifically, the above-described PMIPK thin-film wafer was immersed in each of the organic solvents renewed in Examples and Comparative Example, and the wafer surface was dried by blowing of air. Subsequently, the wafer was immersed in ultrapure water and again dried by blowing of air. Then, the wafer surface was visually inspected for the presence of a residue. Evaluations were made in accordance with the following criteria.

A: No residue was present on the wafer.
B: A small amount of residue that could at least be visually confirmed was present on the wafer.
C: A residue was present on the wafer.
D: A considerable amount of residue was present on the wafer.

Calculation of Molecular-weight Area Ratio S

The organic solvents renewed in Examples and Comparative Example were each distilled under reduced pressure using a rotary evaporator and dried in a vacuum at 60° C. for 8 hours to obtain a residue (solid component). Then, the residue was dissolved in tetrahydrofuran (THF) at a concentration of 0.5% by mass and the molecular weight of the residue was determined using a gel permeation chromatography system (produced by Waters Corporation). In the resulting chromatogram showing the molecular-weight distribution, the area corresponding to components having a molecular weight of 2,900 or more was defined as a, and the area corresponding to components having a molecular weight of less than 2,900 was defined as b. The molecular-weight area ratio S was calculated as S=a/b×100.

Table 1 shows the evaluation results obtained by the above-described evaluation method.

TABLE 1

|  | Example 1 | Example 2 | Example 3 | Example 4 |
|---|---|---|---|---|
| UV irradiation time | 48 h | 6 h | 48 h | 0 h |
| Organic solvent used | Methyl lactate | Methyl lactate | MIBK | Methyl lactate |
| Molecular-weight area ratio S | 3% | 24% | 150% | 180% |
| Ability to clean wafers | A | B | C | D |

A comparison of Examples 1 to 3 with Comparative Example 1 in Table 1 shows that, a resin contained in an organic solvent may be decomposed by ultraviolet irradiation, and thereby the ability of the organic solvent to dissolve a resin is enhanced, which consequently enhances the ability of the organic solvent to clean wafers.

A comparison of Examples 1 and 2 with Example 3 in Table 1 shows that a polyketone resin such as PMIPK may be more efficiently decomposed using an ester solvent than using a ketone solvent and this enhances the ability of the organic solvent to clean wafers.

A comparison of Example 1 with Example 2 in Table 1 shows that, when the molecular-weight area ratio S of a polyketone resin is 5% or less, a markedly enhanced ability to clean wafers is realized.

Example 4

In Example 4, THF (ether solvent) in which poly(methyl methacrylate) (PMMA, polymethacrylate resin) was dissolved was renewed.

A positive Deep-UV resist containing PMMA resin (ODUR-1000, product name, produced by TOKYO OHKA KOGYO CO., LTD.) was applied to a silicon wafer by spin-coating and baked using a hot plate at 120° C. for 3 minutes to form a coating film having a thickness of 2 µm. The resulting wafers (100 wafers) were immersed into 10 L of THF to prepare a THF solution in which PMMA was dissolved.

Figure 3:
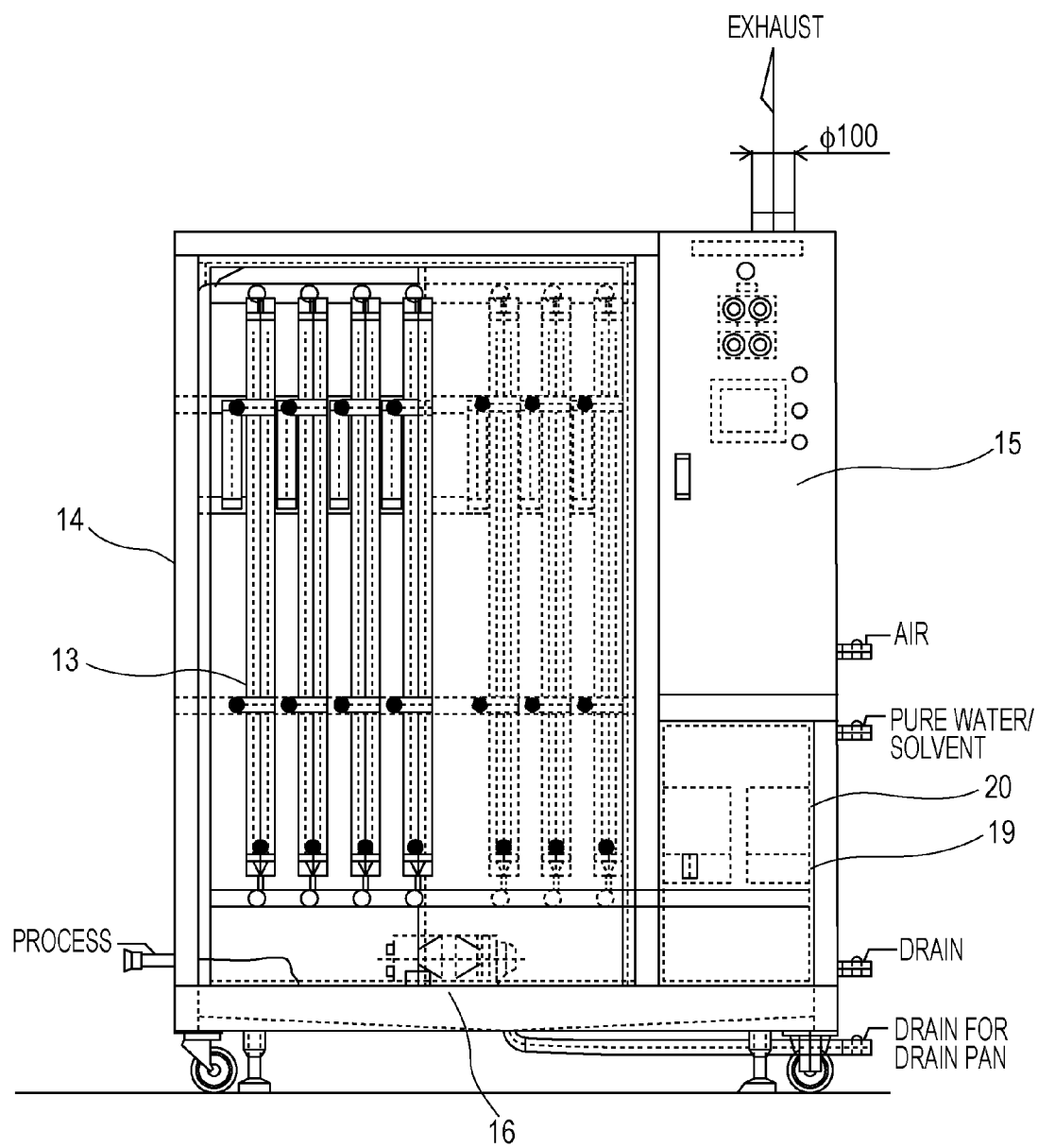
FIG. 3 is a schematic diagram illustrating an example of an organic solvent renewal system.

This THF solution was renewed in the solvent renewal system shown in FIG. 3 for 5 hours.

The system shown in FIG. 3 was designed for solvent renewal and included, in a housing 14, 10 lamp housings 13 shown in FIG. 2, arranged in series. Reference numeral 16 denotes a circulation pump. A control panel 15 was used for controlling a pump and the lamps. The lamps were 30-W sterilization lamps produced by Mitsubishi Electric Osram Ltd. (peak wavelength 254 nm, emission intensity 13.4 W). The diameter φ of a silica tube constituting a solvent-flow passage (serving as an inner pipe) was 35 mm. The clearance (space) between the outer wall of the silica tube and the inner wall of a stainless-steel (SUS) tube (serving as an outer tube) was 5 mm. The length of the lamps was 300 mm.

A waste-liquid tank 19 included two tanks in order to prevent a waste liquid that had been irradiated with ultraviolet rays and a waste liquid that had not yet been irradiated with ultraviolet rays from mixing with each other. The waste liquid that had been irradiated with ultraviolet rays was collected in a waste-liquid collection tank 20. When the first cycle of ultraviolet irradiation was finished, a self-regulating valve (not shown) disposed between an outlet of the waste-liquid collection tank 20 and an inlet of the waste-liquid tank 19 was opened and thereby the waste liquid was transferred to a lower tank. Optionally, the waste liquid may be subjected to the second cycle of ultraviolet irradiation.

The THF solution (10 L) in which PMMA was dissolved was charged in a tank and passed through the renewal system shown in FIG. 3 at a flow rate of 1 L/min. The amount of ultraviolet irradiation to which 1 liter of an organic solvent was exposed using one lamp housing was about 76 J.

The THF solution that had been passed through this renewal system, that is, renewed 1 time had a molecular-weight area ratio S of 20% and an ability to clean wafers of B. The THF solution that had been passed through this renewal system 10 times had a molecular-weight area ratio S of 2% and an ability to clean wafers of A. The THF solution that had not been renewed using the solvent renewal system had a molecular-weight area ratio S of 180% and an ability to clean wafers of D.

Example 5

In Example 5, an effect of improving the yield of inkjet recording heads in manufacture of actual ink-jet substrates was examined using the solvent renewal system shown in FIG. 3. The cleaning liquid (organic solvent) was isoamyl acetate (ester solvent).

A resin included in a mold used for preparing inkjet recording heads, that is, a resin included in a pattern for forming an ink-flow passage was PMIPK (product name: ODUR1010) produced by TOKYO OHKA KOGYO CO., LTD. Since PMIPK is a polyketone resin, a chemical lamp (peak emission wavelength 318 nm) produced by Bogona Club was used as an ultraviolet lamp.

The silicon wafers (100 wafers) having a structure in which ink-jet nozzles were formed on the 8-inch (0.2 m) wafer (substrate 1) as shown schematically in the step c of FIG. 1 were immersed in isoamyl acetate, and the PMIPK resin serving as the pattern for forming an ink-flow passage was removed. Thus, an isoamyl acetate solution in which PMIPK was dissolved was prepared. The wafer included 600 inkjet ejection chips.

The isoamyl acetate solution was passed through the renewal system shown in FIG. 3 at a flow rate of 1 liter/min 1, 5, and 10 times to prepare liquids A, B, and C, respectively. Then, the 8-inch wafers on which the nozzles had been formed were cleaned with these liquids. For each of the liquids A, B, and C, 2 wafers were cleaned. The number of chips was 1,200 in total.

The liquids A to C were each evaluated in terms of the molecular-weight area ratio S and the yield rate. Table 2 shows the evaluation results. A low yield rate of 98% was observed when an isoamyl acetate solution that had not been renewed using the renewal system shown in FIG. 3 was reused for removing the mold material on the 8-inch wafer on which the inkjet nozzles were formed. On the other hand, renewing the organic solvent one or multiple times reduced the molecular-weight area ratio S, which indicates the cleanliness of the isoamyl acetate solution, and accordingly the chip yield was improved.

In the yield evaluation, a chip was evaluated as a non-defective product when all the inkjet nozzles formed on the chip (1,200 nozzles per chip) were capable of ejecting ink.

TABLE 2

| Number of renewal cycles | None | 1 | 5 | 10 |
|---|---|---|---|---|
| GPC molecular-weight area ratio S | 10 | 4 | 1 | 0 |
| Yield (%) | 98 | 99.5 | 99.9 | 100 |

According to the present invention, a method for renewing an organic solvent that enhances the dissolving ability of an organic solvent which is reduced by dissolving a resin and allows the organic solvent to be reused for cleaning wafers in order to produce clean wafers with a reduced cost and a reduced environmental load is provided. Furthermore, according to the present invention, a method for using an organic solvent and a method for producing an inkjet recording head that utilize the above-described method for renewing an organic solvent are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-254234 filed Nov. 20, 2012, which is hereby incorporated by reference herein in its entirety.

What is claimed is:

1. A method for renewing an organic solvent, the method comprising:
an ultraviolet irradiation step in which an organic solvent containing a resin is irradiated with ultraviolet rays so as to enhance an ability of the organic solvent to dissolve the resin,
wherein:
the resin is a polyketone resin;
the organic solvent is an ester solvent; and
the wavelength of the ultraviolet rays is 250 nm or more and 350 nm or less.

2. The method for renewing an organic solvent according to claim 1,
wherein the resin is a polyketone resin, a polymethacrylate resin, or a combination thereof.

3. The method for renewing an organic solvent according to claim 1,
wherein:
the resin is a polyketone resin; and
the organic solvent is at least one selected from ester solvents, ether solvents, alcohol solvents, hydrocarbon solvents, and amine solvents.

4. The method for renewing an organic solvent according to claim 1,
wherein the wavelength of the ultraviolet rays is 290 nm or more and 350 nm or less.

5. The method for renewing an organic solvent according to claim 1,
wherein:
the resin is a polyketone resin; and
in the ultraviolet irradiation step, an organic solvent containing the polyketone resin is irradiated with ultraviolet rays so as to control a molecular-weight area ratio S in a molecular-weight distribution of the polyketone resin contained in the organic solvent determined by gel permeation chromatography to be 5% or less, the molecular-weight area ratio S being calculated by the expression:

$$\text{Molecular-weight area ratio } S(\%) = a/b \times 100$$

where, a represents an area corresponding to components having a molecular weight of 2,900 or more and b represents an area corresponding to components having a molecular weight of less than 2,900.

6. The method for renewing an organic solvent according to claim 1,
wherein:
the resin is a polymethacrylate resin; and
the organic solvent is at least one selected from ketone solvents, ether solvents, alcohol solvents, hydrocarbon solvents, and amine solvents.

7. A method for using an organic solvent, the method comprising:
redissolving a resin in an organic solvent renewed by the method for renewing an organic solvent according to claim 1.

8. A method for producing an inkjet recording head, the method comprising the steps of:
(i) forming a pattern for forming an ink-flow passage on a substrate on which an ink-ejection energy generating element that generates energy used for ejecting ink is formed, the pattern including a resin soluble in an organic solvent;
(ii) forming a resin coating layer on the pattern for forming an ink-flow passage, the resin coating layer serving as an ink-flow passage wall;
(iii) forming an ink-ejection port in the resin coating layer; and
(iv) dissolving and removing the pattern for forming an ink-flow passage using the organic solvent to form an ink-flow passage that communicates with the ink-ejection port,
wherein, the organic solvent used for dissolving and removing the pattern for forming an ink-flow passage in the step (iv) is renewed by the method for renewing an organic solvent according to claim 1 and then reused as the organic solvent in the step (iv).

* * * * *